Dec. 3, 1968  F. J. SLOAN  3,414,181
PARTIAL DEORIENTATION OF SEGMENTS OF BIORIENTED
THERMOPLASTIC SHEET
Filed June 29, 1965  3 Sheets-Sheet 1

INVENTOR.
FRANCIS J. SLOAN
BY
ATTORNEY

Dec. 3, 1968          F. J. SLOAN                3,414,181
       PARTIAL DEORIENTATION OF SEGMENTS OF BIORIENTED
                    THERMOPLASTIC SHEET
Filed June 29, 1965                         3 Sheets-Sheet 2

INVENTOR.
FRANCIS J. SLOAN
BY
Aldo John Casey
ATTORNEY

Dec. 3, 1968 F. J. SLOAN 3,414,181
PARTIAL DEORIENTATION OF SEGMENTS OF BIORIENTED
THERMOPLASTIC SHEET
Filed June 29, 1965 3 Sheets-Sheet 3

INVENTOR
FRANCIS J. SLOAN
BY
ATTORNEY

United States Patent Office

3,414,181
Patented Dec. 3, 1968

3,414,181
PARTIAL DEORIENTATION OF SEGMENTS OF BIORIENTED THERMOPLASTIC SHEET
Francis J. Sloan, Cranford, N.J., assignor to Union Carbide Corporation, a corporation of New York
Filed June 29, 1965, Ser. No. 468,074
34 Claims. (Cl. 229—2.5)

ABSTRACT OF THE DISCLOSURE

A process for forming a three dimensional article from a bioriented thermoplastic sheet by selectively heat-shrinking segments of the sheet causing the sheet to bend in a desired shape.

---

This invention relates to the partial selective deorientation of segments of bioriented thermoplastic sheet to form three dimensional articles from flat bioriented plastic sheet without the use of a mold.

Plastic articles such as sheets with ribbing, trays, cups and the like are commonly formed in the plastics industry by sheet forming operations as vacuum forming, blow molding, die molding, including shallow and deep draw thermoforming, and other conventional methods.

These methods have in common the requirement of at least one mold, usually metal, shaped to produce an article of one size and shape. At least one different mold is frequently required for an article having a different size or shape. In addition considerable force must be expended in such applications to deform plastic sheet into or around a mold to form the resulting three dimensional articles which adds substantially to the production costs thereof. Moreover, such sheet deformation results in thinning of the sheet as well as in problems in maintaining a uniform or controlled wall thickness of the formed article. A process and apparatus which substantially obviates these difficulties has heretofore not been known.

Accordingly, it is an object of the invention to provide a method and apparatus for producing a three-dimensional article from a bioriented thermoplastic sheet without employing a mold but utilizing instead the inherent stresses in bioriented plastic sheet.

It is another object of the invention to provide a ribbed plastic article of biorineted plastic sheet material having at least one elongated partially deoriented zone therein.

These and other objects are accomplished in the present invention which provides a process for forming a ribbed article from bioriented thermoplastic sheet comprising selectively heating a segment of said sheet to a shrink temperature for said bioriented plastic, which segment extends from an edge of said sheet at least part way thereacross, while preserving the biorientation in the remainder of said sheet including the portions thereof on opposing sides of said segment to draw the opposing portions closer and concurrently shrink and deorient the segment in the direction of draw and allowing said segment to cool and set.

The invention will become more apparent from the following detailed specifications and drawings in which.

Figure 1:
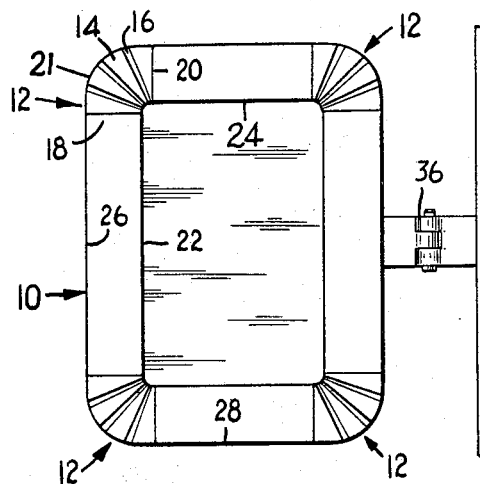
FIGURE 1 is a plan view of an apparatus embodying the invention showing two cooperating platens in an open position and the bioriented thermoplastic sheet to be treated.
Figure 7:
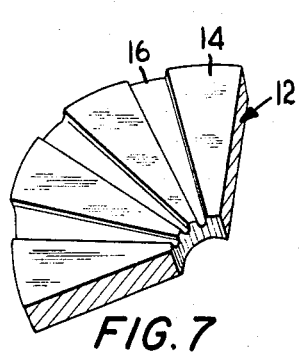
FIGURE 7 is an isometric view of a surface section of a platen of an apparatus of the invention to which heat is applied, having ridges and grooves therein.

Referring now to the drawings, platen 10 has a plurality of heat conducting surface sections 12 at the corners thereof, bounded generally by lines 18, 20 and 21, as shown in FIGURE 1. The sections 12, as illustrated in FIGURES 1 and 7, have a plurality of ridges 14 and grooves 16 therein which converge inwardly from the outer or larger edges thereof. As shown in FIGURE 1, sections 12 are connected on the inner sides thereof by score blades 22 and 24 and, optionally, cutting blades 21, 28 and 26 connecting the outer edges are provided to extend around the outer edges of the sections 12 and thus around the periphery of the platen 10. Means (not shown) serve to heat the sections 12 and the blades 22, 24, 21, 26 and 28 to desired temperatures as will be discussed.

Figure 2:
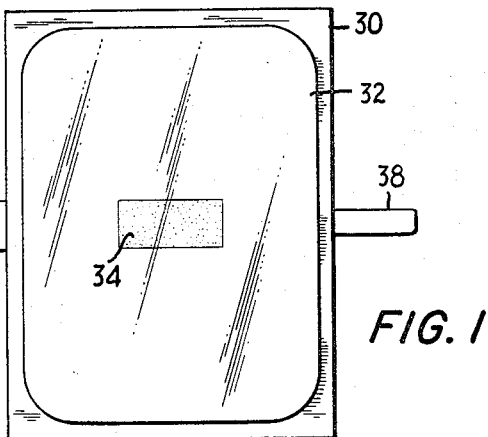
FIGURE 2 is an elevation view of the embodiment of FIGURE 1 with the platens in closed position with the thermoplastic sheet indexed therebetween.
Figure 2:
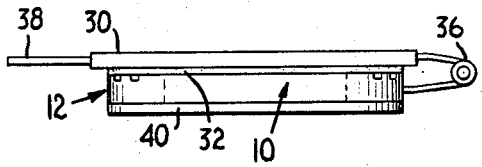

Bioriented plastic sheet 32 is contacted with platen 10 so that its corners extend over the sections 12 and contact the ridges 14 thereof. The sheet can be cut to the size and shape of the platen 10, as indicated in FIGURE 1, be smaller or larger, in which case the cutting blades 21, 26 and 28 serve to trim the sheet to size. The sheet 32 is suitably contacted with the platen 10 as shown in FIGURES 1 and 2, by placing it between platens 10 and 30 and pressing the platen 30 against the platen 10. Optionally, sheet adhering means 34 is provided in platen 30 to securely hold sheet 32 thereto.

Heat is applied to the sections 12 in an amount sufficient to deorient from one side of the plastic sheet to the other, the segments of the sheet in contact with the ridges 14 thereof while the portions of the sheet overlying the grooves 16 are relatively insulated from such heat and remain bioriented. The segments are thus heated above the deorientation temperature of the plastic sheet. Such deorientation temperature varies with the type of bioriented plastic sheet material selected as well as the temperature at which that material was oriented. Such temperature can be readily determined by those skilled in the art by means which include heating the material to its softening temperature or above and noting the temperatures that shrinkage occurs. For example, bioriented polystyrene sheet is heated to a temperatures suitably within a range of 180° F. to 200° F. or above, from one side of the sheet to the other at the selected segments thereof.

Figure 8:
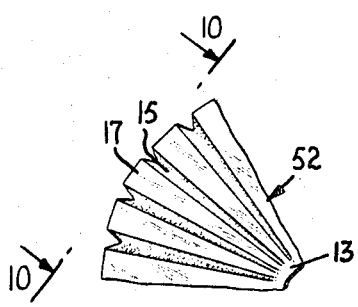
FIGURE 8 is a sectional plan view of a portion of a plastic article embodying the invention which has converging uni-deoriented zones therein.
Figure 10:
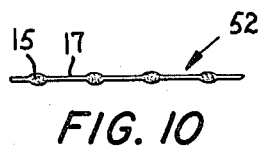
FIGURE 10 is an edge view of the plastic article portion shown in FIGURE 8 looking in the direction of the arrows.

The segments thus heated tend to shrink or deorient drawing the bioriented portions closer to one another thus forming ribbed portions such as, for example, ribbed portion 52, shown in FIGURES 8 and 10 having bioriented portions 17 and shrunken or partially deoriented zones 15 converging to focal zone 13, which zones 15 were formerly the segments of sheet in contact with the ridges 14 of the section 12 shown for example, in FIGURE 7. The bioriented portions 17 are, as indicated, drawn toward one another as the heated sheet segments shrink and, in turn, the portions 17 coact with such segments to substantially confine the shrinkage to the direction of draw while substantially preserving the length of the segments and the orientation thereof in one direction. Thus it can be seen that the zones 15 are segments of bioriented plastic sheet which have shrunk width-wise while substantially retaining their length due to the longitudinal support of the self-sustaining portions 17. Such one directional deorientation is referred to herein as unideorientation. The zones 15 have a small cleavage or notch 17 at the outer edge thereof. The notch occurs due to lack of available support at the central part of the outer edge of each segment from the portions of bioriented sheet adjacent thereto and full deorientation or shrinkage in two directions occurs at such edge as each segment shrinks widthwise.

Upon cooling the zones 15, which have greater thickness than the remainder of the sheet for example, in FIGURE 10, serve as relatively rigid ribs which reinforce the adjacent portions of the sheet. The zones 15 can take various cross-sectional shapes in addition to the generally oval shape shown in FIGURE 10, including generally semicircular, cresent and the like.

As indicated the above heat of deorientation is preferably applied to each segment by contacting a heated section 12 therewith for a period sufficient to bring each segment to the desired deorientation or shrink temperature. Thereafter each associated segment and section preferably are quickly separated to assure that each segment can shrink unimpeded by contact therewith and also that the spread of heat from each segment to the sheet portions adjacent thereto is deterred or minimized. Such sheet portions are prevented from shrinking by maintaining the temperature thereof below deorientation or shrink temperature, to which end the sheet can be cooled well below room temperature before the uni-deorientation step, if desired. Additionally, the above portions can be restrained by mechanical means such as clamping against shrinkage.

It will be recognized that the amount of deorientation heat to be applied to the segments of a given sheet depends upon the thickness of the bioriented thermoplastic sheet as well as the kind of thermoplastic selected. The amount of heat supplied to such segments is in turn regulated by such variables as the temperature of each section employed therefor, the contact pressure between sheet segment and section and the duration of contact time therebetween. Thus for a given sheet thickness an increase in the above contact pressure or heat applied to the section employed can result in a reduction of the above contact time required to heat the segments of the sheet to deorientation temperature. For example, for a .007 inch thick bioriented thermoplastic sheet, a contact time of less than one second is preferred, the associated section or sections being heated to about 250° F. and the contact pressure being about 100 p.s.i. The above variables including contact time, pressure and temperature can readily be determined by those skilled in the art for the practice of the invention.

Figure 3:
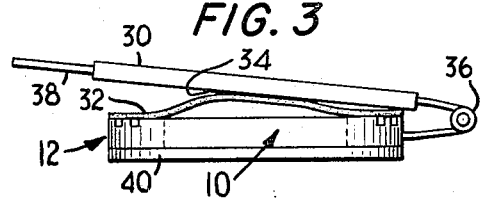
FIGURE 3 is an elevation view of the embodiment shown in FIGURES 1 and 2 in partially open position.

The above shrinkage of such segments of plastic sheet has the further effect of causing the sheet to bend spontaneously to compensate for the decrease in periphery thereof. Thus, after placing the plastic sheet 32 between the platens 10 and 30, as illustrated in FIGURES 1 and 2 and applying heat to score blades 22 and 24 and to the converging corner segments of the plastic sheet, as discussed above, by way of the sections 12, platen 30 is lifted, by handle 38 in cooperation with hinge 36, up and away from platen 10 as shown in FIGURE 3. Whereupon the heated segments of the sheet shrink, forming zones 15 interspersed with portions 17, as discussed and concurrently causing the corner portions and the peripheral portions of the sheet therebetween to bend out of the plane of the sheet, the corner portions bending at about the focal zones 13 thereof and the peripheral portions concurrently bending about the associated score lines 23 and 25 to convert the sheet into the ribbed tray 33 shown in FIGURE 4. The tray 33 has a bottom panel 42, enclosed generally by score lines 23 and 25, with sidewalls 44 joined to end walls 46 by corner portions 45 having zones 15 and portions 17 therein, the sidewalls and corner portions being integral with the bottom panel 42.

As previously indicated, the heated sheet will bend spontaneously to either one side or the other of the plane of the sheet during the uni-deorientation step, provided the sheet is permitted freedom of movement. The adhesion means 34, however, in addition to holding the sheet 32 in position on platen 30, as shown in FIGURE 1, further serves to direct the bending of the sheet by pulling the center portion thereof away from the platen 10 ahead of the sheet corner portion, as illustrated in FIGURE 3, which together with the above deorientation step causes the marginal portions of the sheet to bend away from the platen 30 forming a tray or other plastic article, secured at the base thereof to such platen.

Figure 4:
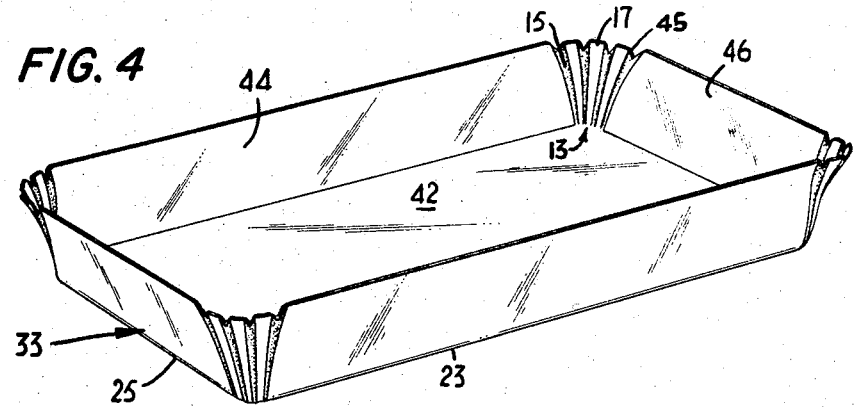
FIGURE 4 is an isometric view of a plastic article embodying the invention in the form of a tray.
Figure 5:
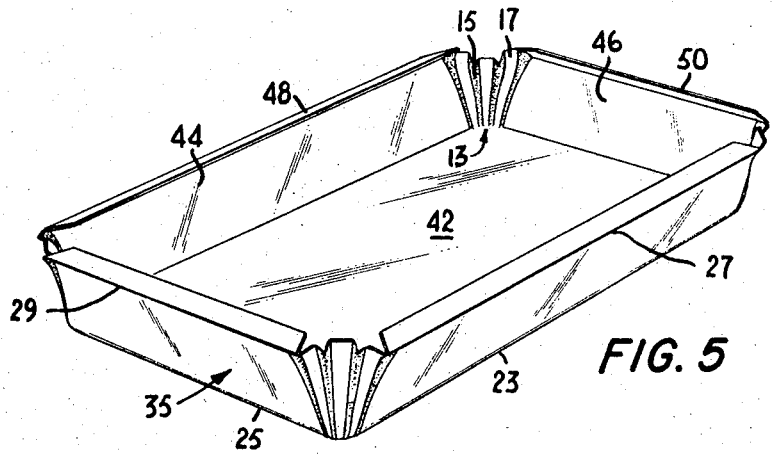
FIGURE 5 is an isometric view of another embodiment of the plastic article of the invention also in the form of a tray.

Various plastic articles can be formed from the above-described procedure including, for example, the ribbed tray 35 illustrated in FIGURE 5. The tray 35 is similar to tray 34 of FIGURE 4 but additionally is provided with flanges 48 and 50 as shown in FIGURE 5. Such flanges are formed for example by scoring the plastic sheet or blank between the corner portions thereof to provide score lines such as lines 27 and 29 of the tray 35. The flanges may be bent before, during the scoring operation or afterward. Hot or cold score blades may be employed. Conveniently, heated scoreblades are positioned on the platen 10 proximate to cutting blades 26 and 28, and substantially parallel therewith so that flange and tray formation are practically concurrent.

The shape of the article formed by the practice of the present invention can be varied from angular to rounded. Thus by employing a platen in which the ridges and grooves are positioned in annular array and converge generally toward the center, as for example, by placing four of the sections 12 of FIGURE 7 together to define an annulus, the ribbed, rounded container 54, shown in FIGURE 6 can be formed from a bioriented plastic sheet. Score line 55 of container 54 can be provided in the blank to assist in the formation of a flat bottom and a relatively straight sidewall.

The ribbed plastic article of the invention can also be formed in relatively flat shape as illustrated in FIGURES 8, 9, 10 and 11, by physically restraining the sheet from bending during the uni-deorientation and cooling steps. Preferably the sheet is quickly cooled by a jet stream of air or other fluid. The shape of such flat sheet can be rounded including circular as well as a polygon shape including rectangular, a combination thereof, or other convenient shapes.

Figure 9:
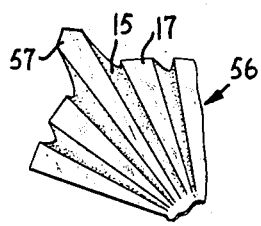
FIGURE 9 is a sectional plan view of a portion of another plastic article embodying the invention.

The shape of the thermoplastic sheet or blank strongly influences the final shape of the uni-deoriented plastics sheet. Thus a rounded corner blank, when uni-deoriented in segments converging inwardly from the arcuate periphery thereof, produces a uni-deoriented product such as ribbed portion 52 shown in FIGURE 8 while a right angle corner portion which is similarly uni-deoriented produces a product such as ribbed portion 56, having uni-deoriented zones 15 and bioriented portions 17 and 57, as shown in FIGURE 9.

Figure 11:
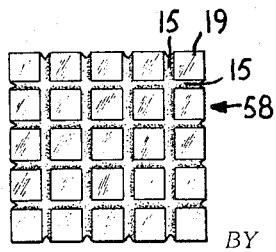
FIGURE 11 is a plan view of a portion of another plastic article embodying the invention which has intersecting unideoriented zones therein.

Another embodiment of the invention is ribbed portion 58, having bioriented portions 19 and intersecting uni-deoriented zones 15 as shown in FIGURE 11. Such intersecting zones 15 give added strength to the plastic sheet as well as decorative effect. The zones can be formed in various angles of intersection and in various designs in the above-described containers or flat sheet as desired.

Figure 12:
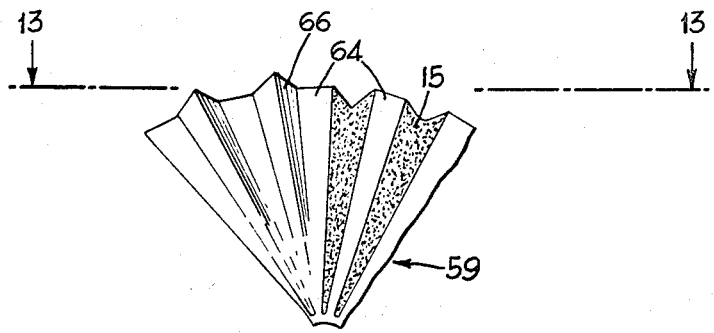
FIGURE 12 is a sectional plan view of a portion of a laminated plastic article embodying the invention.
Figure 13:
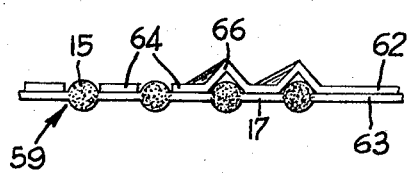
FIGURE 13 is an edge view of the plastic article portion shown in FIGURE 12, looking in the direction of the arrows.

In another embodiment of the invention a laminate 59, having ribbed portion 60 bonded to layer 62, is shown in FIGURES 12 and 13. Ribbed portion 60 comprises bioriented portions 17 and uni-deoriented zones 15. Layer 62 includes portions 64 and 66. Portions 64 are attached to unshrunk plastic such as portions 17 and portions 66 are pleated due to the shrinkage thereunder of zones 15.

An important feature of the present invention is the employment of the inherent tendency of bioriented thermoplastic sheet to shrink when subject to heat to spontaneously form plastic articles including containers and the like. At least one segment of the plastic sheet is heated to a shrink temperature while the adjoining portions of the sheet on opposing sides of the segment are maintained below shrink temperature. The segment or segments selected, preferably is elongated and tapers inwardly from one edge of the sheet. However, the segment can take other shapes such as a polyhedron shape including a generally rectangular strip, a strip which runs from edge to edge, straight or curved strips or virtually any shape selected by those skilled in the art, within the teachings herein set forth. It is preferred that at least one end of the segment which is heated extend to the edge of the plastic sheet in order that the unoriented portions of the sheet, on both sides thereof can draw toward one another unimpeded at the edge. Where desired, such segment can taper inwardly of such edge and terminate in substantially a peak at the end thereof remote from said edge so that the opposing portions can move together as the segment therebetween shrinks with little hindrance or wrinkling of the bioriented sheet occurring at either end of the segment. Similarly, where the segment extends across a sheet from edge to edge, with or without tapering, the opposite portions can move together without hindrance at either end as indicated.

However, where the segment does not extend to an edge of the plastic sheet but is wholly enclosed therein, still such segment is within the scope of this invention and can be employed to effect some degree of shrinkage and uni-deorientation particularly where the segment is an elongated strip.

As previously indicated, uni-deorientation of a segment of bioriented plastic strip occurs due to the longitudinal support of the self sustaining portions 17 which substantially uphold the length of the segment therebetween while the segment shrinks widthwise. However, the support such opposing portions can provide toward upholding the length of such segment diminishes as the width of the segment increases until the middle part of the segment deorients to shrink in both directions causing the middle part to buckle and producing a deep cleavage between the two opposing portions which weakens the bond therebetween.

The segment width can also be narrow approaching a score line in width. However for a very narrow segment little shrinkage and uni-deorientation occurs and thus, those skilled in the art can readily select the suitable area width. For example, to form the tray of FIGURE 4 having a size of 4″ by 6″ by 1¼″, the heated areas suitably taper from a width of ⅜″.

It will be appreciated that the uni-deoriented zone of the present invention even in its narrowest form, differs from a score line applied to a plastic sheet, as by a score rule, heated or unheated, in that in a scoring operation the sheet is stretch deformed about the edge of the rule while in the present invention no stretch of the sheet occurs, rather the sheet is shrink deformed. Moreover, the uni-deoriented zone of the present invention is thicker in cross-section and stronger than the associated sheet material whereas a scoreline in the same material is generally thinner in cross-section and provides a line of weakness or hinge line in the sheet.

In a given bioriented thermoplastic sheet the segments to be uni-deoriented and the portions remaining bioriented can take the same or various sizes as desired. Thus where the segments and portions are interspersed in side by side array in a bioriented plastic sheet, including where such segments and portions converge to a focal zone, the segments can be, for example, a ratio of 1 to 5 times the width of the portions or more, or less, as selected by the skilled practitioner. The above ratio will be determined by such factors as how much shrinkage is desired and the degree of orientation in the sheet, i.e., how much stretching has been applied to the sheet. If the segments are proportionately too wide with respect to the width of the portions interspersed therewith the portions will not give sufficient longitudinal support to the segments as they shrink upon application of heat, while if the segments are proportionately too narrow, the shrinking achieved will be relatively little. It is preferred that the width of such segments be about twice as wide as the width of such portions, or a ratio of 2 to 1, in forming, for example, the tray of FIGURE 4 and the container of FIGURE 6. Thus, referring to FIGURES 7 and 8, a sheet portion having segments about the size of ridges 14 and portions about the size of grooves 16 of section 12, for a ratio of about 2 to 1 in width, upon uni-deorientation forms ribbed portion 52 having zones 15 and portions 17.

As indicated in FIGURES 8 and 11 for example, the zones 15 can be arranged in parallel, converging or intersecting array.

The material suitable for use in the present invention can be any bioriented thermoplastic sheet such as bioriented polystyrene, vinyl, polyethylene, polypropylene and any other thermoplastic sheet material which exhibits release of tension and shrinking upon the application of heat thereto.

The thickness of the sheet material can be virtually any size convenient for the skilled practitioner from a sheet or film of, for example, .001 inch to a sheet over 1.0 inch in thickness. It is also conceivable that the above sheet selected can be less than .001 inch thick depending upon the desired application as where a miniature ribbed article is to be made within the scope of the present invention.

The shape of the bioriented plastic sheet employed can vary from polygon shaped including rectangular, triangular and the like to rounded including circular, oval and the like. The sheet can be curved or prebent prior to the uni-deorientation step but it is preferably flat.

A bent article can be formed from a bioriented plastic sheet by the process of the invention by forming at least one uni-deoriented zone therein, which extends from one edge of the sheet partway thereacross or a zone extending across the sheet from edge to edge which tapers along at least part of its length. For example, uni-deorientation is suitably applied to a polygon shaped sheet, to segments thereof which converge inwardly from the edges of each corner portion to define corner focal zones so that such segments are converted by application of heat to uni-deoriented zones concurrently forming a tray or other bent article. The uni-deoriented zones can also be situated between such corners and extending inwardly from the edges thereof. Moreover the zones can extend inwardly from points situated all about the periphery of the sheet, whether said sheet is rounded or polygon shaped and such zones can, if desired, converge so as to define a rounded or polygon-shaped hub portion or base panel therein which remains bioriented.

Score lines, which can be straight, curved or a combination thereof, are preferably formed in the blank or plastic sheet before or during the uni-deorientation step to provide hinge lines where it is desired to bend the sheet upon formation of the article and form sharp or clearly defined panel junctions therein. The score lines suitably run from corner focal zone to corner focal zone, i.e., the convergent areas of the segments to be heated, since the corners pivot at such focal zones upon bending out of the plane of the sheet. The score lines can, in addition, extend through the corner focal zones. However, the score lines are not essential to the practice of the present invention and can be omitted where desired or added after the article is formed.

Figure 6:
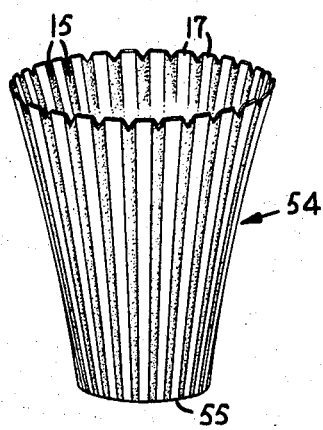
FIGURE 6 is an isometric view of another embodiment of the plastic article of the invention in the form of a rounded container.

It can readily be seen that various articles can be made by the process of the present invention in addition to the containers of FIGURES 4, 5 and 6. Illustrative of such articles are a flat or bent bioriented plastic sheet having one or more deoriented zones therein, which sheet can be scored and bent after formation if desired, bioriented thermoplastic sheet having uni-deoriented zones intersecting at any convenient angle which can be included in a flat sheet or bent article, containers having 2, 3 and 5 or more walls, straight or curved or other rounded containers such as cylindrical, ellipsoidal, globular and the like.

The blank employed for forming the ribbed article of the invention can be a single bioriented thermoplastic sheet, a laminate of two or more such sheets or a laminate of at least one of such sheets and a coating or a sheet of other material selected by those skilled in the art. Such other material can be, for example, virtually any plastic sheet including film, cellulosic materials, including paper board and the like. These materials are preferably flexible and adapted to bend in cooperation with the associated bioriented thermoplastic sheet as the latter sheet undergoes uni-deorientation and if necessary, bending. In addition, the laminar sheets which form a blank need not be coextensive but can be of different sizes and shapes for structural or decorative variations. For example, in forming a container from a laminate of bioriented thermoplastic sheet and paper-board, portions of the paper-board layer can be cut away, if desired, so that the plastic sheet layer can be subjected to uni-deorientation without subjecting the paper-board to the accompanying heat thereof. However the above portions of the paper-board need not be cut away since paper-board or other non-shrinkable layers can adapt to the unideorientation of an associated bi-oriented plastic sheet layer by fluting or forming pleats as that associated layer shrinks thereunder.

The shape of the containers are determined by such factors as the shape of the blank, the shape, size and location of the segment or segments heated, the degree of orientation of the sheet, the amount of shrinkage imparted to each segment, the rate of separating the heated segments from the sections of the platen, and the amount of bending a sheet is permitted before the unideoriented zones cool. In the formation of a container, such as that illustrated in FIGURE 6, rapid removal of the plastic sheet from the heated platen, after sufficient shrink or deorientation heat has been applied thereto, will result in a container having a relatively straight wall, i.e., a wall relatively straight from score line 55 up to periphery thereof. However, where, under such circumstances, the heated plastic sheet is removed slowly from the heated platen, curved side walls from score line 55 up to the periphery thereof will occur. The curve of the sidewalls will be influenced by how the heated sheet is pulled off the platen. If, for example, the mid-section of the sheet is pulled slowly off the platen ahead of the periphery thereof, the outer periphery cools before it can fully shrink and the periphery of the thus formed container flares outwardly. If, on the other hand, the peripheral portions of the sheet are pulled slowly off the platen ahead of the midsection, the periphery shrinks substantially fully while the inner portions do not and a container is formed wherein the periphery curves inward in a globular shape.

By employing various degrees of heating the sheet segments and varying the speed of separating the sheet from the platen and the pressure of contact of the sheet with the platen containers can also be formed having walls, which have an undulating curve from focal zone to edge, including an inverted bell shape. Thus it can be seen that various wall curvatures can be fashioned in the employment of the above discussed variables by the skilled practitioner.

The angle of bend of the plastic sheet between, for example, side wall and bottom panel, of a tray or rounded container, is determined by such factors as the manner in which the heated sheet is separated from the forming platen as indicated above, the amount of shrink applied to the sheet segments and the size and number of such segments. Such blend angle can be brought to 90°, 80° or less by employing such factors, particularly a high shrink ratio. Additionally, in the formation of a tray, by forming the sections, such as illustrated in FIGURE 1, so that the two straight sides thereof 18 and 20 converge at an angle greater than 90° considerable shrink occurs at the corners to form an acute bend angle. However the above bend angle is preferably greater than 90° to adapt the tray or container to easy nesting and stacking.

Adjacent walls of the bent article of the invention, such as the tray of FIGURE 4, do not meet at a sharp angle but at a generally curved corner portion as formed by the zones 15 and portions 17. Such corner portions and thus the zones 15 terminate in a focal zone which can be a common vertex or point or a line including an arc of small radius of curvature. The latter arrangement is preferred since it permits greater shrinkage of sheet material at the corners and thus draws the walls of a container up to a smaller angle with the bottom panel thereof than if the corner portion terminated in a common vertex.

The heating section or sections of the platen is made of heat conducting material such as metal including stainless steel and preferably aluminum. Each section can take any convenient shape, e.g., a polyhedron, a disc, a solid having a curved surface and the like provided the section has at least one ridge upstanding therefrom or a plurality of ridges and grooves adapted to contact the surface of a plastic sheet. The ridges, where there are a plurality thereof can be positioned in parallel converging or intersecting array. Each ridge face, i.e., that side of the ridge which is adapted to contact a sheet, can have a polygon shape, a curved shape, i.e., a shape which corresponds to the shape of the desired segment to be heated as previously discussed.

The grooves of the section are of a depth and width sufficient to provide heat insulating gaps between the ridges thereof so that upon contacting a bioriented plastic sheet with a heated section, the portions of the sheet overlying the grooves remain relatively unheated and bioriented, while the segments of the sheet in contact with the ridges are heated to a suitable deorientation temperature. The grooves can be, in addition, wholly or partially filled with any conventional heat insulating material where desired. Factors affecting the size of the grooves include the type of plastic, thickness of the sheet and the amount of heat which must be applied to the section to deorient the segments of the sheet from one side to the other.

The forming platen can be formed of one or more sections and a lesser or nonheat conducting plate which together form a surface for receiving the plastic sheet. The platen can also be merely a plurality of sections together or spaced apart or even one section. Conveniently, the platen is a composite of at least one section mounted in or adjacent to a plate of relatively low thermal conductivity, the ribs of each section being generally flush with the surface of the plate. The sections are preferably mounted to extend to the periphery of the platen although they can be placed within the periphery of such platen. Score and cutting blades can be mounted on the platen as desired and can extend between sections as previously indicated. Conveniently, four 90-degree sections are employed at the corners of a rectangular platen for forming a ribbed tray, which sections can be removed and mounted together to form an annular platen as well for forming a ribbed, rounded container, such as a cup, from flat bioriented plastic sheet.

The sheet can be contacted with the forming platen by any convenient means such as by hand, clamp or other convenient device practical to the skilled craftsman. Conveniently, a second platen can be employed to contact the bioriented plastic sheet with the forming platen, the sheet being indexed between the two platens. The second platen can be of resilient material or metal. Moreover the second platen can have at least one heated section therein which is or is not the mirror image of the forming platen to cooperate therewith and heat the sheet from both sides.

The second platen can in addition have a sheet adhering means such as adhesive tape or a vacuum port to hold the sheet thereto and direct the formation of the article as previously discussed. Such adhering means will be useful in pulling the heated sheet off the forming platen, particularly if the heated segments of the sheet stick or cling to the heated sections. Such cling can be reduced or avoided by application of such coatings as silicone varnishes, Teflon and the like to the sections of the forming platen.

The adhering means can be situated near the center of the second platen to hold the sheet in the center portion and assist in pulling that portion of the sheet from the forming platen ahead of the periphery thereof. The adhering means can also be situated in the platen elsewhere to hold, for example, only the peripheral parts of heated areas of the sheet to assist in pulling such part or parts of the sheet from the forming platen ahead of the center portion thereof. Alternatively, the second platen need have no sheet adhering means or one that releases the sheet upon heating the segments and separation of the platens so that, with appropriate inclination of the platens, the formed article can be allowed to fall from the separated platens to storage or oher treatment.

What is claimed is:

1. A ribbed plastic article comprising, bioriented thermoplastic sheet material having a partially deoriented zone therein, said zone being elongated and tapered and extending inwardly from an edge of said sheet part way thereacross, said zone being oriented in the direction of elongation and substantially deoriented in a direction transverse thereto and having a greater cross-sectional thickness than the remainder of said sheet material.

2. The article of claim 1 wherein said zone extends from an edge of said sheet part way across said sheet and tapers to a peak.

3. The article of claim 1 wherein at least one layer of cellulosic sheet material is laminated to said bioriented thermoplastic sheet material.

4. The article of claim 1 wherein at least one layer of plastic sheet material is laminated to said bioriented thermoplastic sheet material.

5. The article of claim 4 wherein at least one layer of cellulosic sheet material is laminated to at least one of said layers of plastic sheet material.

6. A ribbed plastic article comprising, bioriented thermoplastic sheet material having a plurality of partially deoriented zones therein, said zones extending from an edge of said material part way thereacross, said zones being elongated and flanked on opposing sides by bioriented portions of said sheet material, at least one of said zones being tapered and each of said zones being oriented in the direction of elongation thereof and substantially deoriented in a direction transverse thereto and having a greater cross-sectional thickness than said portions.

7. The article of claim 6 wherein said zones and said portions are arrayed in alternate strips.

8. The article of claim 6 wherein said zones and said portions are arrayed in converging strips, said zones tapering in the direction of convergence.

9. The article of claim 6 wherein said zones and said portions are arrayed inconvering strips, said strips tapering in the direction of convergence.

10. The article of claim 6 wherein a plurality of said zones intersect and define said portions therebetween.

11. A ribbed bent plastic article comprising bioriented thermoplastic sheet material having a plurality of elongated partially deoriented zones extending partially thereacross, which zones extend inwardly from at least one edge of said sheet, said zones being flanked on opposing elongated sides by bioriented portions of said sheet material, at least one of said zones being tapered and each of said zones being oriented in the direction of elongation thereof and substantially deoriented in a direction transverse thereto and having a greater cross-sectional thickness than said portions, said sheet material being bent in the vicinity of said zones.

12. The article of claim 11 wherein said zones converge inwardly from said edge.

13. A ribbed tray of oriented plastic sheet comprising a panel having a polygon shape, a plurality of walls upstanding from said panel at the perimetric sides thereof, corner wall portions joining adjacent walls and upstanding from said panel at the corners thereof, each of said corner portions having a plurality of elongated partially deoriented zones therein, which zones extend inwardly from the edges of each corner portion to terminate in close proximity with one another and proximate the associated corner of said panel, each of said zones being oriented in the direction of elongation thereof and substantially deoriented in a direction transverse thereto, the remainder of the tray being of bioriented sheet material of less cross sectional thickness than said zones.

14. The tray of claim 13, wherein the panel, walls and corner portions are all integral one with another and the walls and corner portions define a wall extending continuously around the periphery of said panel.

15. The tray of claim 13 wherein said zones converge inwardly from the edges of each of said corner portions.

16. The tray of claim 13 wherein said zones converge and taper inwardly from the edges of each corner portion to terminate in an area of small radius of curvature and thus define the associated corner of said panel.

17. The tray of claim 15 wherein the panel is substantially rectangular and four walls joined by four corner portions are connected thereto to define a generally rectangular tray.

18. A rounded container of oriented plastic sheet comprising a rounded panel, a continuous curved wall extending about the periphery of said panel and upstanding therefrom, said wall having a plurality of elongated partially deoriented zones therein, which zones extend from the upstanding edge of said wall across said wall to terminate proximate the perimeter of said panel, each of said zones being oriented in the direction of elongation thereof and substantially deoriented in a direction transverse thereto, the remainder of the container being of bioriented sheet material of lesser cross sectional thickness than said zones.

19. The container of claim 18 wherein said zones converge inwardly from the upstanding edge of said wall and the shape of the container is generally frustroconical with said rounded panel defining the smaller end thereof.

20. The container of claim 18 wherein said wall is curved in a direction of from said upstanding edge to the perimeter of said panel.

21. A process for forming a ribbed article from bioriented thermoplastic sheet comprising selectively heating a segment of said sheet to a shrink temperature for said bioriented plastic, which segment is tapered and extends from an edge of said sheet part way thereacross, while preserving the biorientation in the remainder of said sheet including the portions thereof on opposing sides of said segment to draw the opposing portions closer and concurrently shrink and deorient the segment in the direction of draw and allowing said segment to cool and set.

22. The process of claim 21 wherein said segment is a strip extending from an edge of said sheet part way across said sheet tapering to a peak, which strip is flanked by said opposing portions so that upon application of said heat to said area said opposed portions draw closer, reducing the width of said strip.

23. A process for forming a ribbed article from bioriented thermoplastic sheet comprising selectively heating a plurality of segments of said sheet to a shrink temperature for said bioriented plastic, each segment extending from an edge of said sheet part way thereacross and at least one segment being tapered, while preserving the biorientation in the remainder of said sheet including the portions thereof interspersed with said segments and on opposing sides thereof to draw the opposing portions closer, shrinking and deorienting said segments in the direction of draw and allowing said segments to cool and set.

24. The process of claim 23 wherein said segments and said portions are arrayed in alternate strips so that upon application of said heat to said segments, said portions draw closer.

25. The process of claim 23 wherein said segments and said portions are arrayed in converging strips, said segments tapering in the direction of convergence.

26. The process of claim 23 wherein a plurality of said segments are disposed in intersecting strips and define said portions therebetween.

27. A process for forming a ribbed and bent article from bioriented plastic sheet comprising selectively heating segments of said sheet to a shrink temperature for said bioriented plastic, which segments taper and converge inwardly from at least one edge of the sheet and extend part way thereacross, while preserving the biorientation in the remainder of the sheet including the portions thereof interspersed with said segments and on opposing sides thereof to draw the opposing portions closer, shrinking and deorienting said segments in the direction of draw and concurrently bend thet sheet in the vicinity of said converging segments thus forming the article and allowing said areas to cool and set.

28. A process for forming a ribbed tray from bioriented plastic sheet having a polygon shape comprising, selectively heating a plurality of segments of said sheet at each corner thereof to a shrink temperature for said bioriented plastic, which segments taper and converge inwardly from the edges of said corner, extend part way across said sheet and terminate in close proximity with one another o define a corner focal zone; while preserving the biorientation in the remainder of the sheet including the portions of the sheet interspersed with said segments and on opposing sides thereof to draw at each corner the opposing portions closer, shrinking and deorienting said segments in the direction of draw, causing said corners, including the converging segments there-situated and the peripheral portions of the sheet between said corners to bend out of the plane of said sheet, on one side thereof, said corners beinding at about the focal zones thereof to convert said sheet into a tray having a continuous wall about the periphery thereof.

29. The process of claim 28 wherein prior to shrinking said converging segments, the sheet is scored in lines connecting the adjacent corner focal zones to provide hinge lines for said peripheral portions of the sheet to facilitate the bending thereof and to fix the boundaries of the base and walls of the tray to be formed.

30. The process of claim 29 wherein a four cornered tray is formed from a rectangular sheet of thermoplastic.

31. The process of claim 29 wherein a sheet having rounded corners is employed.

32. A process for forming a ribbed rounded container from bioriented plastic sheet comprising selectively heating a plurality of segments of said sheet to a shrink temperature for said bioriented plastic, which segments taper and converge inwardly from locations spaced about the periphery of said sheet, extend part way thereacross and terminate to define the perimeter of a rounded hub portion, while preserving the biorientation in said hub portion and the portions interspersed with said converging segments and on opposing sides thereof to draw the opposing portions closer, shrinking and deorienting said segments in the direction of draw, causing the part of said sheet having said converging segments to bend in the locale of said perimeter out of the plane of the sheet, on one side thereof, to convert said sheet into a container having a rounded hub base and a generally curved wall.

33. The process of claim 32 wherein prior to shrinking said converging segments a scoreline is impressed on the hub perimeter to facilitate said bend and to fix the boundary of the base and wall of said rounded container.

34. The process of claim 33 wherein said sheet is circular and said segments converge to a circular hub concentric with the periphery of said sheet.

References Cited

UNITED STATES PATENTS

| | | | |
|---|---|---|---|
| 2,218,388 | 10/1940 | Twombly | 229—3.5 X |
| 3,033,434 | 5/1962 | Carson | 229—2.5 |
| 3,081,571 | 3/1963 | Dayen et al. | 156—84 X |

DAVIS T. MOORHEAD, *Primary Examiner.*